United States Patent [19]

Kageyama et al.

[11] Patent Number: 4,791,496
[45] Date of Patent: Dec. 13, 1988

[54] SYSTEM FOR PRESENTING AUDIOVISUAL INFORMATION TO AN AUDIENCE

[75] Inventors: Satōshi Kageyama; Yasushi Nakamura; Takashi Kōndō, all of Yokohama; Shōzō Abe, Kawasaki; Kazuhiro Mori, Tokyo, all of Japan

[73] Assignee: Kabushiki Kaisha Toshiba, Kawasaki, Japan

[21] Appl. No.: 849,823

[22] Filed: Apr. 9, 1986

[30] Foreign Application Priority Data

Apr. 12, 1985 [JP] Japan .................................. 60-77884

[51] Int. Cl.⁴ .............................................. H04N 5/76
[52] U.S. Cl. .................................... 358/342; 365/105; 360/10.1; 353/19
[58] Field of Search .................... 360/1, 10.1; 358/342; 353/15, 19; 381/51; 365/105

[56] References Cited

U.S. PATENT DOCUMENTS

| | | | |
|---|---|---|---|
| 4,122,613 | 10/1978 | Karalus et al. | 353/19 |
| 4,602,296 | 7/1986 | Murakoshi | 360/10.1 |
| 4,635,136 | 1/1987 | Ciampa et al. | 358/342 |
| 4,672,471 | 6/1987 | Gouda | 358/342 |
| 4,672,472 | 6/1987 | Sugiyama | 358/342 |
| 4,679,085 | 7/1987 | Johnson et al. | 365/105 |

Primary Examiner—Russell E. Adams
Attorney, Agent, or Firm—Oblon, Fisher, Spivak, McClelland & Maier

[57] ABSTRACT

With an audiovisual information presentation system, pictorial image data, drawn on paper sheets in advance and to be optically projected on a screen using an optical projector, is sequentially sensed by a TV camea. Speech corresponding to the image data is input through a microphone. A data storage unit stores the image data and corresponding audio data together with code data for identifying pairs of image and audio data. When a search mode is designated, a desired pair of image and audio data is automatically searched from the data storage unit under the control of a CPU, and is reproduced by electrical monitor display units and a loudspeaker unit independent of image display on the projection screen.

6 Claims, 3 Drawing Sheets

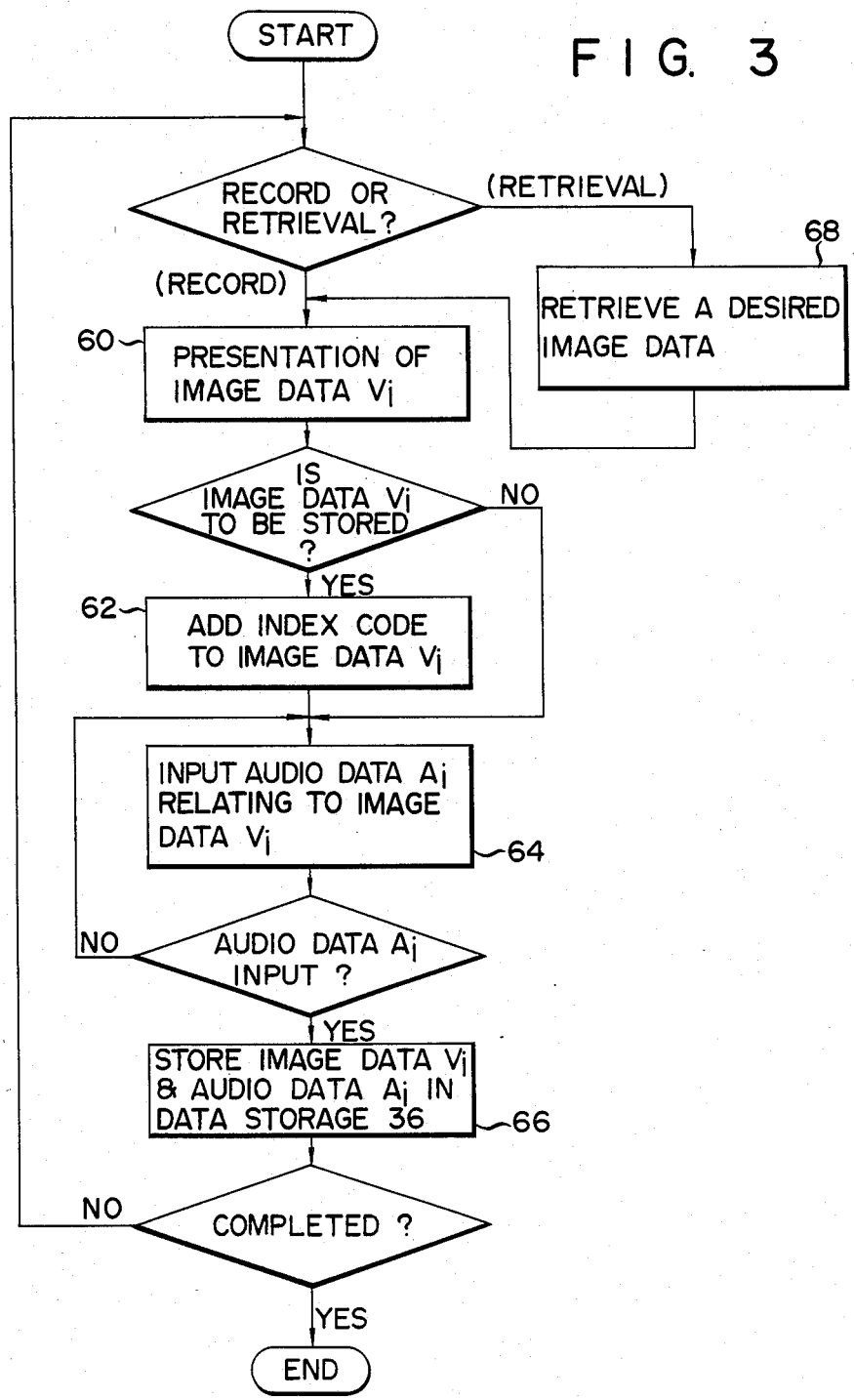

SYSTEM FOR PRESENTING AUDIOVISUAL INFORMATION TO AN AUDIENCE

BACKGROUND OF THE INVENTION

The present invention relates to an audiovisual system and, more particularly, to an audiovisual information presentation system for presenting various reference data images to an audience.

Audiovisual presentation using an optical image projector as the medium by which to enlarge and project reference material onto a projection screen is recently, in the interest of facilitating better understanding, a common occurrence wherever information is to be exchanged. When reference images are projected on the screen, the speaker's intent can be more readily grasped by the audience.

In particular, when a scholar or engineer presents the results of his or her study at a scientific or academic conference, it is critical for effective presentation of the study to supplement the speech with projected images. Since projection timing can be freely adjusted by the speaker, the flow of the presentation is not interrupted and the audience need not refer to their reference documents; instead, they can concentrate on the presentation without distraction.

Presentation apparatuses such as overhead projectors (OHP) or slide film projectors are the most commonly used optical image projection systems. An optical image projection system of this type, unlike a normal cineprojector, can clearly present images in a relatively bright room. When an overhead projector is used, images of materials to be projected are prepared in advance. These materials might include characteristic graphs, drawings associated with the results of a study, and so on. The graphs and drawings are drawn on special-purpose transparent sheets (known as OHP sheets). The OHP sheets are placed as desired on the document table of the projector by the speaker himself or by an assistant, and are optically projected onto a screen. If desired, a plurality of OHP sheets can be stacked on the table to project an overlapping image onto the screen.

After an OHP sheet has been projected, it is manually replaced with the next sheet. In general, used OHP sheets are stacked carelessly on, for example, a side table. Therefore, when a used OHP sheet is required for a subsequent projection, it may take a considerable amount of time to locate it from among the stack of already projected sheets, interrupting the flow of the presentation.

It has been still admitted among skilled persons that the image quality (particularly in resolution) of current CRT display units is not yet as good as that of conventional optical image projection system, CRT screens being, in addition, of a limited size. It is expected, then, that optical projection systems, capable of projecting a large, high-quality image, will continue to be the leading means of audiovisual presentation in the future. To provide a projector that can overcome the above-mentioned drawbacks of conventional projectors is, therefore, greatly desired.

SUMMARY OF THE INVENTION

It is therefore an object of the present invention to provide a new and improved system for presenting audiovisual information to an audience, which can automatically and effectively present audiovisual information to an audience in the desired order at the desired time.

It is another object of the present invention to provide a new and improved system for presenting audiovisual information to an audience, which can automatically assist presentation of OHP sheet image data and audio data and in this way overcome the need to perform cumbersome manual management of OHP sheets when using an optical image presentation system.

According to the audiovisual information presentation system of the present invention, illustrations drawn on paper sheets and representing a plurality of image data are sequentially sensed to produce corresponding electrical image data. A speech input device receives input speech audio data associated with the image data to produce electrical audio data corresponding to each video image data. A data storage unit stores a plurality of image data and a plurality of corresponding audio data together with code data used in identifying pairs of image and audio data. A searching device is connected to the data storage unit. When a search mode is designated, the searching device retrieves desired image data from the storage unit. The searching device can also retrieve a desired pair of image and audio data from the storage unit. The retrieved pair of image and audio data is then electrically reproduced by an audiovisual reproduction unit.

The system of the present invention can be combined with an optical image projection apparatus for sequentially projecting illustrations drawn on paper sheets. In this case, images sequentially projected onto the projection screen of the apparatus are imaged by an image input device in real time, thus producing video image signals. The speech input device receives input speech audio data for each of the projected images and produces audio signals, corresponding to each video image, in real time. The data storage unit has a memory capacity sufficient to store a plurality of pairs of video and audio data (each pair including image data to be displayed and audio data corresponding thereto), and index code data. A recording search control device is connected to the data storage unit. The control device receives, in a recording mode, image data from the image input device together with corresponding audio data from the speech input device. When, in the search mode, an already projected image is requested again, the control device automatically retrieves a desired pair of image and audio data from the storage unit. The audiovisual information reproduction device electrically reproduces the retrieved pair of image and audio data independent of the optical image display on the projection screen.

BRIEF DESCRIPTION OF THE DRAWINGS

The present invention is best understood by reference to the accompanying drawings, in which:

FIG. 3 is a flow chart explaining the main operation sequence of the system in FIG. 1.

DETAILED DESCRIPTION OF THE PREFERRED EMBODIMENTS

Figure 1:
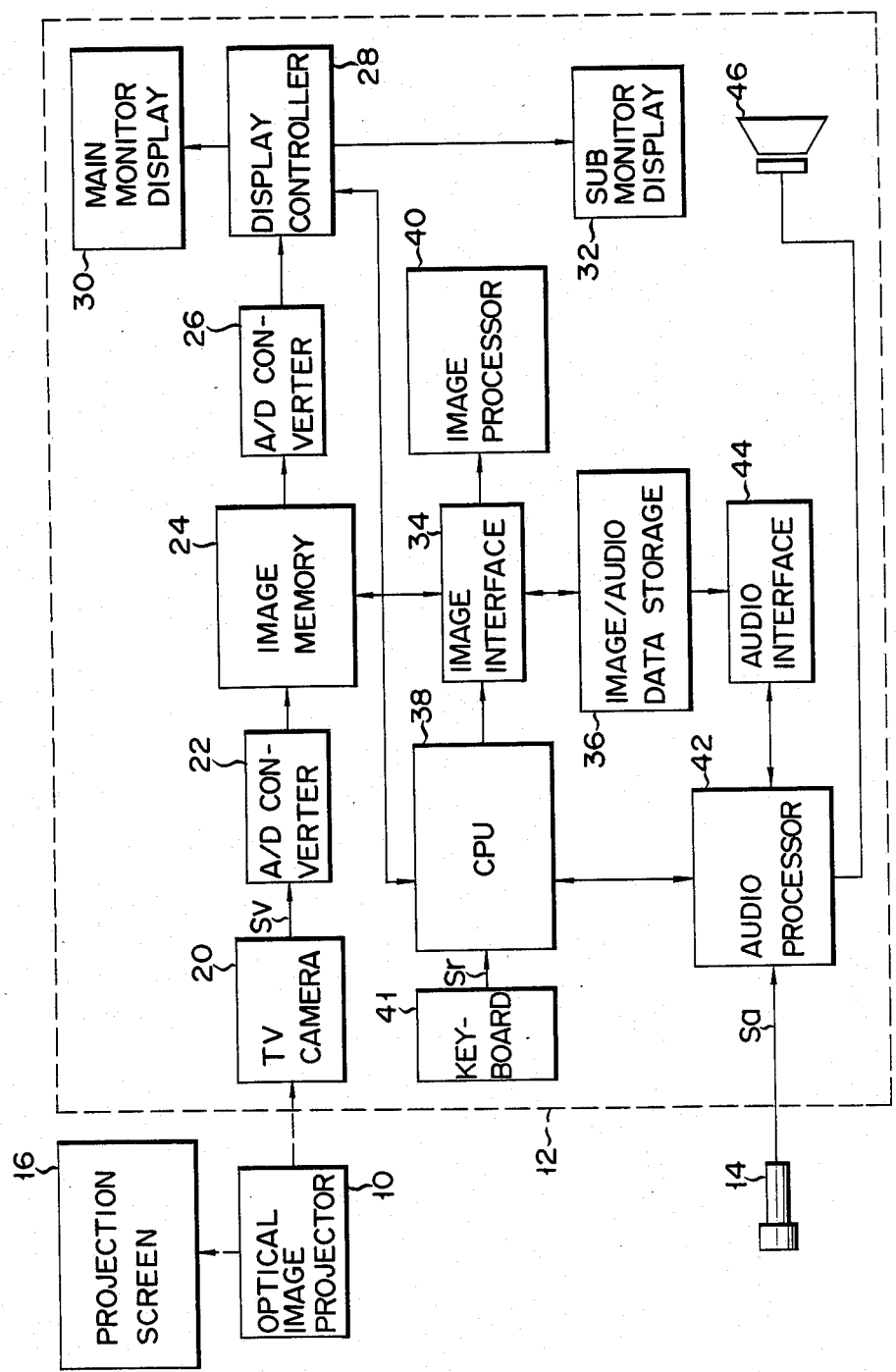
FIG. 1 is a block diagram of an audiovisual presentation system according to one preferred embodiment of the present invention.

Referring now to FIG. 1, an optical audiovisual information presentation system according to one preferred embodiment of the present invention consists essentially of conventional overhead projection apparatus (or optical projector) 10 and an audiovisual information automatic control apparaus indicated by broken-line block 12. Apparatus 12 stores image data, which is presented to an audience using optical projector 10, and audio data presented using electric microphone 14. If necessary, apparatus 12 can automatically search for desired data, thus assisting in presentation of audiovisual infomation using projector 10.

When a presenter makes a speech (e.g., presents a result of his study) using microphone 14, he manually selects an original sheet to be presented to the audience from reference materials drawn on transparent sheets (generally known as "OHP sheets") in advance and places the selected sheet on a known document table (not shown in FIG. 1) of projector 10. The original image on the sheet is optically enlarged and projected onto known projection screen 16.

Apparatus 12 has TV camera 20 (e.g., a known video camera). Camera 20 senses the image drawn on the OHP sheet placed on the document table and produces an electrical video signal (analog video signal). The image (still image) currently projected on screen 16 is electrically input to apparatus 12 by camera 20. Electrical video signal Sv from camera 20 is converted into a digital image signal by analog-to-digital converter (to be referred to as "A/D converter" hereinafter) 22. The digital image signal is supplied to image memory 24. In this embodiment, memory 24 compries and erasable refresh memory. Memory 24 temporarily stores the digital image signal.

Memory 24 is connected through digital-to-analog converter (to be referred to as "D/A converter" hereinafter) 26 to display controller 28, which controls the display operation of a plurality of electrical monitor display units installed at the place of meeting. These monitor display units include large-screen CRT display unit (main display) 30 and small-screen CRT display unit (sub display) 32. The digital image data stored in memory 24 is converted into an analog image signal by D/A converter 26, and is then supplied to display controller 28. Main display 30 is installed at the place of meeting or room adjacent to screen 16. Sub display 32 can be used as a monitor for the presenter, or can be provided for each person of the audience. In the latter case, a plurality of sub displays 32 are required.

Memory 24 is also connected through image data interface 34 to image/audio data storage unit 36, which serves as a main memory. In this embodiment, main memory 36 comprises a data-rewritable magnetic recording disk unit, but can, if desired, comprise another type of recording medium such as an optical disk unit. Image data interface 34 is also connected to CPU 38 and image signal processing unit 40.

Keyboard 41 connected to CPU 38 is manually operated by the presenter or an assistant and serves as a man-machine interface between the operator and CPU 38. CPU 38 comprises a software-controlled microprocessor. The microprocessor totally controls the functions and operations of apparatus 12 (to be described later in more detail) in response to various instruction signals (including an operation mode instruction signal, a data requesting signal, etc.) entered by the operator through keyboard 41. Image processor 40 performs required post-processing of the stored image data (e.g., enlargement, reduction, edge emphasis correction, color correction, defocus correction, and the like). Processor 40 can also have functions for editing or discriminating image data.

Under the control of CPU 38, index code data is added to the digital image data to be stored and the data is then supplied to memory 36 through interface 34 to be stored at a corresponding address. The index code data is used as an index for searching desired image data together with the corresponding audio data from the large amount of still image data stored in memory 36. In its most simple form, index code data consists of numeric data representing the presentation order. As another example, code data having a several bit configuration and representing the content of corresponding image data can be added to the digital image data.

Audio processing unit 42 is connected to microphone 14 which is used when the presenter makes a speech. Unit 42 receives an electrical analog audio signal, i.e., speech audio signal Sa converted by microphone 14 under the control of CPU 38. Unit 42 is connected to memory 36 through audio interface 44, and to known loudspeaker unit 46. Audio interface 44 converts signal Sa into a signal with a format suitable for storage in memory 36. The converted signal is supplied to main memory, namely, image/audio memory 36. The signal supplied to memory 36 is added to the corresponding image data under the control of CPU 38, and is stored at a certain memory address of memory 36 in one-to-one correspondence with the corresponding image data, as shown in FIG. 2.

Figure 2:
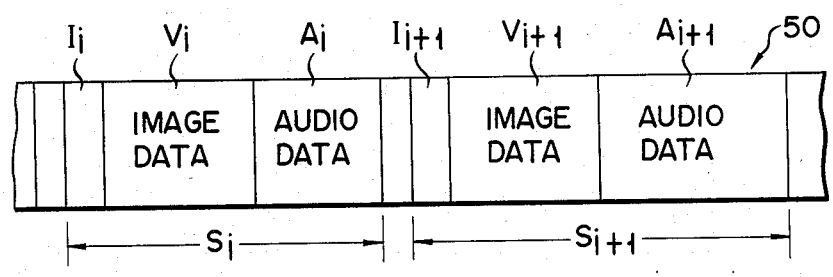
FIG. 2 is an illustration of the storage state of image data and its corresponding speech audio data in an image/audio data memory in the system of FIG. 1.

Referring to FIG. 2, which is a schematic illustration of data storage tracks, reference numeral 50 designates data storage tracks of a magnetic disk constituting memory 36. The ith image data Vi and corresponding audio data Ai are stored together in given storage region Si in a disk track. Index data Ii is stored immediately before data Vi. Image data Vi+1, representing the next reference image to be projected on screen 16, and audio data Ai+1 corresponding thereto are stored in subsequent storage region Si+1 in the disk track. Since the amount of audio data corresponding to one image data is not defined and changes in accordance with the speech interval of the presenter, the respective data lengths of regions Si, Si+1, . . . in the disk track are changed, as shown in FIG. 2. Since the audio data is stored in memory 36 to correspond with the image data, when a certain image is designated and retrieved, the corresponding audio data is also read out from memory 36 and reproduced by unit 46.

With the system of this embodiment, audiovisual information control (to be described below) can be performed automatically under the control of CPU 38 in response to various instructions input through keyboard 41. A large number of original sheets, prepared for presenting reference images to an audience, can be managed or searched using the projection system, thus effectively assisting presentation of image data in the projection system.

The operation of the representation system basically includes recording and search modes. When a presenter or his assistant operates keyboard 41 to designate the recording mode, CPU 38 sets apparatus 12 in a recording standby state. In the recording mode, when a presentation is given while referring to optically projected images, the images projected on screen 16 are sequentially sensed by TV camera 20, converted into digital image signals by A/D converter 22, and supplied to memory 36. At the same time, the speech audio data is supplied to main memory 36 through microphone 14 and audio processor 42. The corresponding image and audio data are automatically provided with common index data and stored in memory 36, as previously described with reference to FIG. 2. Therefore, image data projected once on screen 16 and corresponding speech audio data are automatically converted into electrical data under the control of CPU 38, and sequentially stored in memory 36. As a result, particular attention need not be paid to the administration of already used original sheets. If an image which has been projected once is needed again, it can be electrically reproduced on the monitor display unit or units in accordance with the image data stored in memory 36.

The recording operation of apparatus 12 will now be described in more detail with reference to the flow chart of FIG. 3.

In the recording mode, an original sheet containing reference images Vi to be projected is placed on the document table of projector 10, and image data Vi is sensed by camera 20 and temporarily stored in memory 24. At the same time, data Vi is displayed on main and sub displays 30 and 32. This state is indicated by block 60 in the flow chart of FIG. 3.

Subsequently, CPU 38 checks if image data Vi stored in memory 24 is to be recorded in image/audio data storage unit (main memory) 36. CPU 38 compares image data Vi temporarily stored in memory 24 with image data previously stored in memory 36 (expressed as Vi−1 herein) to automatically detect if the illustration pattern of data Vi is different from that of data Vi−1. If the pattern of data Vi is different from that of data Vi−1, data Vi is supplied to memory 36 through interface 34. In this case, CPU 38 automatically assigns index code data to data Vi for identification. If detection of a difference in patterns fails, or if it is detected that the pattern of data Vi is the same as that of data Vi−1, data Vi is prevented from being supplied to memory 36 through interface 34, and index code-adding step 62 is not executed.

Speech presented to an audience together with data Vi continues to be input to apparatus 12 through microphone 14 as audio data Ai. Data Ai is processed by audio processor 42 (e.g., time compression, bandwidth compression, modulation, etc.) to make it suitable for memory storage. If it is detected that input of data Ai corresponding to data Vi is completed, data Vi and Ai are stored in memory 36 together with index code data. In the recording mode, when an original sheet containing reference image Vi+1, the next image to be projected, is placed on the document table of projector 10, image data Vi+1 and corresponding audio cata Ai+1 are storec together in memory 36 in the same manner as above. After repeating the recording operation, a plurality of pairs of image and audio data are stored in memory 36, as shown in FIG. 2.

During the presentation, if an image already projected on screen 16 is requested again (e.g., by a member of the audience), the operator switches from the recording mode to the search mode of apparatus 12 through keyboard 41. In this case, CPU 38 sets apparatus 12 in a search standby mode. The operator then selects the desired image data using keyboard 41. Keyboard 41 produces request signal Sr for designating a desired pair of image and audio data. In response to signal Sr, CPU 38 searches and retrieves the pair of data containing the desired image (see block 68 in FIG. 3). The search operation is performed relatively easily with reference to the index code data in accordance with a normal technique known to those skilled in the art. Immediately after the operator designates the desired image data, the corresponding index code data is detected by CPU 38, and the storage address thereof in memory 36 can be found easily.

Switching between recording and search modes and execution of a designated operation mode can be repeated until the presentation is finished and the operation of apparatus 12 is stopped by the operator through keyboard 41.

Figure 4:
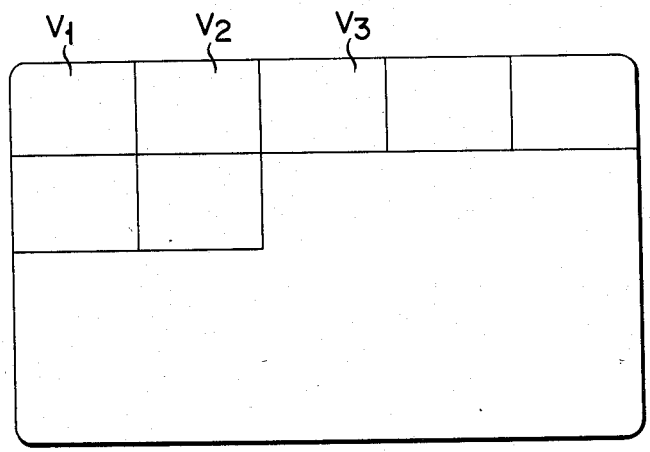
FIG. 4 is a diagram showing the multidisplay state of different, reduced image data on the display screen of the CRT display unit in the system of FIG. 1.

It should be noted that when image data stored in memory 36 is to be displayed on one display screen as a series of reduced images in accordance with the above-mentioned recording mode, the operator must input a multi-image display instruction through keyboard 41. In response to this instruction, CPU 38 executes reduction processing of the recorded image data. In this embodiment, image data is reduced to 1/20 of its original size. The reduced image data is supplied to display controller 28 through memory 24, and 20 reduction images are displayed on monitor display unit (substantially the same as display unit 32) 70 for the presenter, as shown in FIG. 4. More specifically, sequentially recorded 20 pieces of image data V1, V2, V3,..., Vi are simultaneously displayed on a single display screen. If the presenter presents his or her study while referring to the multi-image display, he or she can easily confirm the patterns and orders of images previously presented to the audience. Note that if a multi-image display is unnecessary, the image data is transferred directly between memories 24 and 36 without going through processor 40. In this case, only one image data is displayed on units 30, 32, and 70.

With apparatus 12 of the present invention, when a study is presented to an audience using projector 10, image data projected on screen 16 is electrically stored in memory 36, and if necessary can be accurately extracted at high speed using an electronic searching technique. The extracted image data is displayed on display units 30 and 32 adjacent to the optical image display on screen 16. Therefore, original sheets containing images to be presented by projector 10 can be automatically controlled by apparatus 12, thus effectively assisting presentation of image data with projector 10.

Furthermore, according to the apparatus of the present invention, speech audio data corresponding to each image data can be simultaneously stored in memory 36. Therefore, when requested image data is displayed, the speech audio data can be reproduced by the loudspeaker unit at the same time if necessary. Audiovisual presentations at lectures, conferences, schools and so on can thus be facilitated and made more flexible.

In addition, the present invention can remove the need of using a projector for an audiovisual presentation. Image data from original sheets can be stored in memory 36 before a presentation. In this case, illustrations on the original sheets are stored in memory 36 together with corresponding speech audio data. Therefore, when the presentation is given, apparatus 12 can be used without projector 10 as an automatic audiovisual presentation apparatus. This widens the range of practical applications of apparatus 12.

Although the present invention has been shown and described with reference to particular embodiments, various changes and modifications which are obvious to a person skilled in the art to which the invention pertains are deemed to lie within the scope of the invention.

For example, respective components adopted in the above embodiment can be freely modified by a person skilled in the art in order to realize the disclosed functions. For example, a data-erasable magnetic disk unit is adopted in the above embodiment as main memory 36. If data-erasable properties are unnecessary, the magnetic disk unit can be replaced with an optical or equivalent disk unit. There are no doubt a great number of such modifications within the scope of the core concept of the present invention that cannot be disclsed in this specification.

What is claimed is:

1. An audiovisual information presentation system, which is used together with an optical image projection apparatus for sequentially optically projecting illustrations drawn on paper sheets in advance onto a projection screen when a presentation is made to an audience at a meeting place, and whch stores and administrates the illustrations on the paper sheets, said system comprising:

image input means for sensing images projected on said projection screen of said optical image projection apparatus to produce corresponding video image signals;

speech input means for receiving an input speech relating to the images projected on said projection screen and producing audio signals corresponding to each video image signal in a real time manner;

data storage means electrically connected to said image input means and said speech input means and having a memory capacity sufficient to store a plurality of pairs of image and audio data together with index code data, each of said pairs including image data to be displayed and corresponding audio data;

control means, connected to said data storage means, for, in a recording mode, storing in said data storage means the image data input by said image input means together with the corresponding audio data input by said speech input means, and for, in a search mode, retrieving a desired pair of image and audio data from said data storage means when an image already projected on said projection screen is requested again during the presentation; and reproduction means, connected to said data storage means, for receiving the received pair of image and audio data and electrically reproducing it independent of an optical image displayed on said projection screen.

2. The system according to claim 1, further comprising:

data input means, connected to said control means and manually operated by an operator, for producing a request signal designating that an image already projected on said projection screen is to be supplied to said control means, said control means performing a retrieving operation in response to the request signal.

3. The system according to claim 2, wherein said control means automatically detects a change in image patterns sensed by said image input means when an image optically projected on said projection screen is replaced with another image, so that different index code data is automatically added to the another image, and the another image with the different index code data is stored in said data storage means together with audio data corresponding thereto.

4. The system according to claim 2, wherein said reproduction means comprises:

a first electrical display unit for presenting the image data included in the retrieved pair of image and audio data independent of the image projected onto said projection screen of said optical image projection apparatus; and a loudspeaker unit for acoustically reproducing the audio data included in the retrieved pair of image and audio data.

5. The system according to claim 4, wherein said reproduction means further comprises at least one second electrical monitor display unit having a display screen.

6. The system according to claim 5, further comprising:

image processing means, connected to said data storage means and said second electrical monitor display unit, for reducing the image data included in the plurality of pairs of image and audio data stored in said data storage means, so that a required number of images, which include the image data currently displayed on said projection screen of said optical image projection apparatus and the data displayed before and after, are simultaneously displayed on said display screen of said second electrical monitor display unit to obtain a multi image.

* * * * *